W. C. MARTIN.
CUSHION WHEEL CONSTRUCTION.
APPLICATION FILED APR. 11, 1919.
1,412,534.
Patented Apr. 11, 1922.
2 SHEETS—SHEET 1.
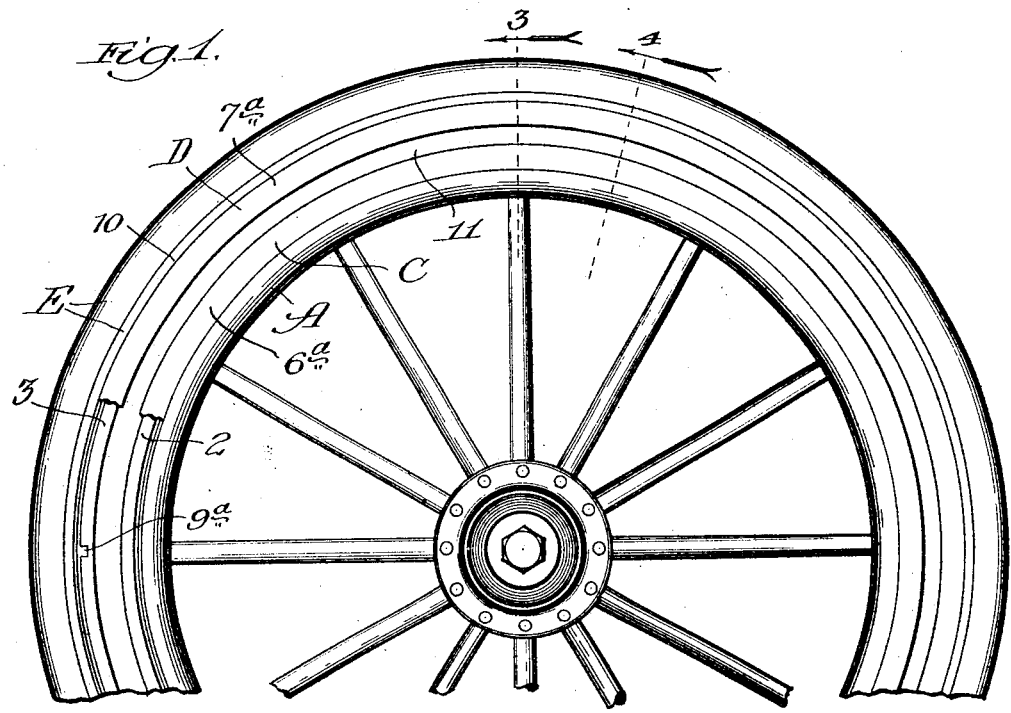
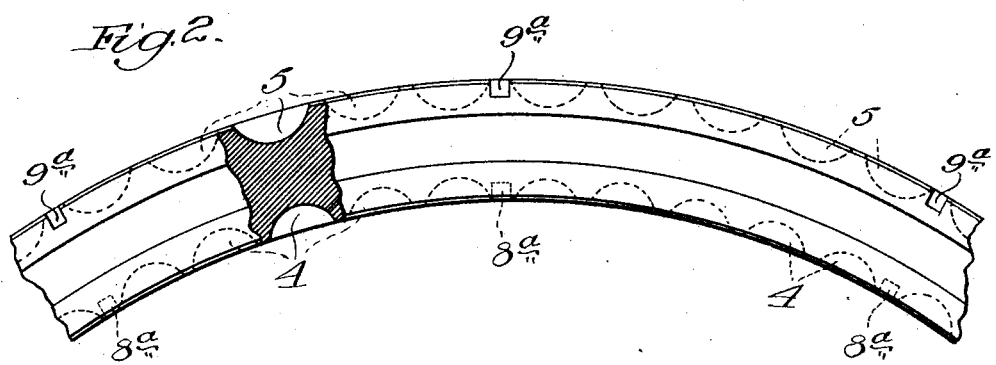
Witnesses:
Inventor:
William C. Martin,
By Dyrenforth, Lee, Chritton & Wiles,
Att'ys.

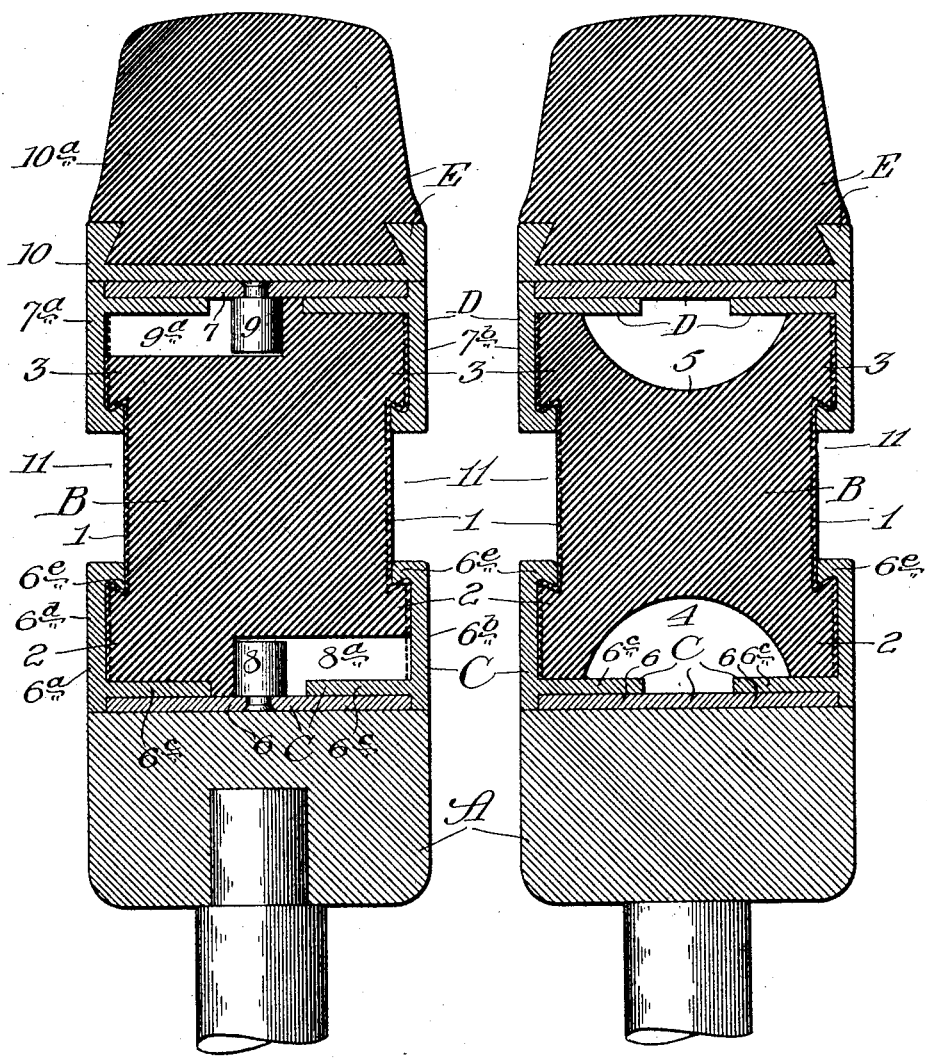

UNITED STATES PATENT OFFICE.

WILLIAM C. MARTIN, OF CHICAGO, ILLINOIS, ASSIGNOR TO MARTIN CUSHION WHEEL CO., OF CHICAGO, ILLINOIS, A CORPORATION OF ILLINOIS.

CUSHION-WHEEL CONSTRUCTION.

1,412,534. Specification of Letters Patent. Patented Apr. 11, 1922.

Application filed April 11, 1919. Serial No. 289,255.

*To all whom it may concern:*

Be it known that I, WILLIAM C. MARTIN, a citizen of the United States, residing at Chicago, in the county of Cook and State of Illinois, have invented a new and useful Improvement in Cushion-Wheel Construction, of which the following is a specification.

This invention relates particularly to cushion-wheel construction for the wheels of motor vehicles; and the primary object is to provide a simple, cheap and durable cushion-wheel construction in which the special cushion-element employed is well adapted to distribute road shocks throughout the circumference of the wheel and thus dissipate the shocks.

The invention is illustrated in its preferred embodiment in the accompanying drawings, in which—

Fig. 1 represents a broken elevational view of a motor vehicle wheel constructed in accordance with the invention; Fig. 2, a broken side elevational view of the special annular cushion-element employed, a portion of the cushion element being shown in section; Fig. 3, an enlarged transverse sectional view taken as indicated at line 3 of Fig. 1; and Fig. 4, a similar section taken as indicated at line 4 of Fig. 1.

In the construction illustrated, A represents the felly of the wheel; B, a special cushion-element employed; C, an inner cushion-rim; D, an outer cushion-rim; and E, a tire mounted on the outer cushion-rim.

The wheel A may be of any suitable construction.

The cushion-element B comprises an annulus of elastic soft rubber. The member B is preferably of integral cross-section, and preferably is formed as a complete annulus. It is formed by a molding and vulcanizing operation. If desired, it may comprise two semi-annular members, for instance, or any equivalent form may be employed. It is preferred, however, to mold and vulcanize the member B in the form of a complete annulus; and it is preferred to provide the lateral surfaces of the cushion-element with reinforcing plies of fabric, but which may be introduced in the molding and vulcanizing operation.

The cushion-element B is provided with inner annular flanges 2 and outer annular flanges 3. Also, the member B is provided at its inner circumferential wall with a series of recesses 4, and at its outer circumferential wall with a series of recesses 5. These recesses are concealed when the cushion-element and rims are assembled. In other words, these recesses do not open at the sides of the cushion-element.

The inner cushion-rim preferably comprises a steel band 6 which is applied to or shrunk on the felly A; and separately formed flanges $6^a$ and $6^b$ which are secured in place by forcing them under heavy pressure upon the band 6.

The outer cushion-rim D comprises steel bands 7 upon which the tire is mounted; and separately formed flanges $7^a$ and $7^b$ which are secured in place by forcing them under heavy pressure into the band 7.

In the illustration given, each of the cushion-securing flanges is substantially an L-shaped member. For example, the flange $6^a$ comprises an annular member $6^c$ which encircles the band 6, a vertical side member $6^d$, and an inturned undercut flange $6^e$. The other cushion-securing flanges are of similar form.

The inner attaching flanges 2 of the cushion-element B are shaped to conform to the attaching flanges of the rim by which they are engaged. This is likewise true of the outer attaching flanges 3 of the cushion-element. It will be understood, therefore, that when the parts are assembled the cushion-element B will be securely fastened both to the outer rim and to the inner rim. Any tendency to deformation of the wheel would be resisted therefore by compression of the member B throughout some portions of the member and by distension of the member B throughout other portions of the member.

The inner steel band 6 is provided centrally with a circumferential series of studs 8 adapted to prevent creeping of the cushion-element on the wheel. These studs are entered in transverse slots $8^a$ with which the inner circumferential portion of the cushion-element is provided, these slots opening at one side of the cushion-element. The outer steel band 7 is provided with an annular series of studs 9 which enter slots $9^a$ with which the outer circumferential portion of the cushion-element is provided, these slots $9^a$ preferably opening at the opposite side of the cushion-element.

In assembling the wheel, the flange $6^b$ is forced on to the band 6 under a pressure of many tons, so that after it is applied it is so securely held as to give practically the same effect as though it were formed integrally with the band 6; the cushion-element is then forced upon the wheel, the slots 8ª permitting the studs 8 to enter the base-portion of the cushion-element as it is applied to the wheel; the flange 6ª is then forced into position under heavy pressure. In a similar manner, the flange 7ª is forced into the band 7, either before or after the tire E is applied; the band 7 is then forced on to the tire, the studs 9 entering through the slots 9ª; and the flange 7ᵇ is then forced into position under a heavy pressure. The pressure employed in forcing the parts together is sufficiently heavy to insure the parts being securely held together by friction, due to the heavy tension exerted by the steel bands. For most wheels, a pressure of 10 to 20 tons will suffice to insure such a secure connection of the parts as to cause the cushion-rims to act as virtually integral rims when the wheel is in use.

The tire E, in the construction shown, comprises a steel channel 10 and a solid rubber tire member 10ª. The tire is applied to the outer cushion-rim in such manner as to be securely mounted thereon. Ordinarily this is effected by forcing the tire on to the rim under heavy pressure.

The annular series of inner recesses 4 and the annular series of outer recesses 5 of the cushion-element B give to the tire an increased resiliency. These recesses are securely housed or covered; also, the laterally opening recesses 8ª and 9ª of the cushion-element are so disposed that they are securely covered or housed by the cushion-attaching flanges of the rims when the parts are assembled.

From the description given, it will be understood that the improved construction provides a boltless cushion-wheel construction in which the cushion-element is securely attached both to the inner cushion-rim and the outer cushion-rim. The side flanges of these cushion-rims are separated by annular spaces 11, these spaces being ample to permit such deformation of the wheel as may be necessary to give scope to the resiliency of the cushion-element in dissipating shocks caused by the wheels striking obstructions or dropping into ruts in the road. Both the elasticity of compression and the elasticity of distension of the cushion-element are utilized in the construction.

While the slots 8ª and 9ª are shown as opening at opposite sides of the cushion-element, it is to be understood that this is merely a preferred arrangement. If desired, for the purpose of simplifying the assembling operation, these slots may all open at the same side of the cushion-element.

The foregoing detailed description has been given for clearness of understanding only and no unnecessary limitation should be understood therefrom, but the appended claims should be construed as broadly as permissible in view of the prior art.

What I regard as new, and desire to secure by Letters Patent, is:

1. In cushion-wheel construction, the combination with a wheel and tire, of interposed means comprising an annular rubber cushion-element provided with inner annular flanges, and outer annular flanges, an inner cushion-rim on said wheel having flanges interlockingly engaging the inner flanges of said cushion-element, at least one of the flanges of said inner cushion-rim being of substantially L-form cross-section and frictionally held in position on said wheel; an outer cushion-rim within said tire and having annular flanges interlockingly engaging the outer flanges of said cushion-element, at least one of the flanges of said outer cushion-rim being of substantially L-form cross-section and frictionally held in position within said tire; and intermediate studs on said rims engaging transverse recesses in the inner and outer circumferential portions of said cushion element.

2. In cushion-wheel construction, the combination of an annular rubber cushion-element of integral cross-section provided with an inner circumferential series of recesses and an outer circumferential series of recesses adapted to increase the resiliency of the cushion-element, said cushion-element having inner annular flanges and outer annular flanges; sectionally constructed inner and outer cushion-rims having flanges interlockingly engaging the flanges of said cushion-element; and intermediate studs carried by said cushion-rims and engaging slots in said cushion-element, the outer end of said slots being closed by the flanges of said rims.

3. The combination of a felly, an inner cushion-rim comprising a band securely mounted on said felly and L-shaped flanges held thereon under intense frictional force, a tire comprising a steel band, an outer cushion-rim comprising a band and L-shaped flanges held therein under intense frictional force, and an annular rubber cushion element seated in and secured to said cushion-rims.

4. The combination of a wheel, an inner cushion-rim frictionally held thereon comprising a band and side flanges frictionally held therein, a tire comprising a steel band, an outer cushion-rim frictionally held therein and comprising a band and side flanges frictionally held therein, and an annular rubber cushion element having its inner circumferential portion secured to the inner cushion-rim and its outer circumferential portion secured to the outer cushion-rim.

5. The combination of a felly, an inner cushion-rim comprising a band securely mounted on said felly and flanges having cylindrical portions embracing said band and having portions encircling the felly, against which the edges of said band abut; a tire comprising a steel band, an outer cushion-rim comprising a band and flanges having cylindrical portions fitting within said band and having portions embracing the edges of said band and encircled by the steel band of said tire, and a rubber cushion element confined between and secured to said cushion-rims.

WILLIAM C. MARTIN.